United States Patent [19]

Laine

[11] 4,225,116
[45] Sep. 30, 1980

[54] CHAIN TENSIONER

[75] Inventor: Reijo Laine, Rauma, Finland

[73] Assignee: Lapela Oy, Rauma, Finland

[21] Appl. No.: 949,638

[22] Filed: Oct. 10, 1978

[30] Foreign Application Priority Data

Oct. 10, 1977 [FI] Finland ................................. 772973

[51] Int. Cl.³ .............................................. B66F 3/00
[52] U.S. Cl. ................................................... 254/247
[58] Field of Search ................ 105/368 T; 254/73, 74, 254/78, 164, 134.3 R; 74/148, 149, 154, 155

[56] References Cited

U.S. PATENT DOCUMENTS

| 1,079,700 | 11/1913 | Gibson | 254/164 |
| 1,223,510 | 4/1917 | Moe et al. | 254/164 |
| 2,604,678 | 7/1952 | Mayes | 254/78 |
| 3,343,809 | 9/1967 | Newell | 254/134.3 R |

FOREIGN PATENT DOCUMENTS 265262 2/1927 United Kingdom ................... 254/164

Primary Examiner—Robert C. Watson
Attorney, Agent, or Firm—Pravel, Gambrell, Hewitt, Kirk, Kimball & Dodge

[57] ABSTRACT

The present invention is concerned with a device for tensioning a chain. The chain tensioner in accordance with the present invention was developed in particular for securing deck cargo on ships and for binding timber bundles. As regards its technology, it is simplified as extensively as possible in order to reach reliability of operation in all possible circumstances. Owing to the simplicity of the construction, almost all maintenance becomes unnecessary and a reliability of operation is reached that meets the requirements imposed by the recommendations of the IMCO (Intergov. Maritime Consultative Organization).

4 Claims, 3 Drawing Figures

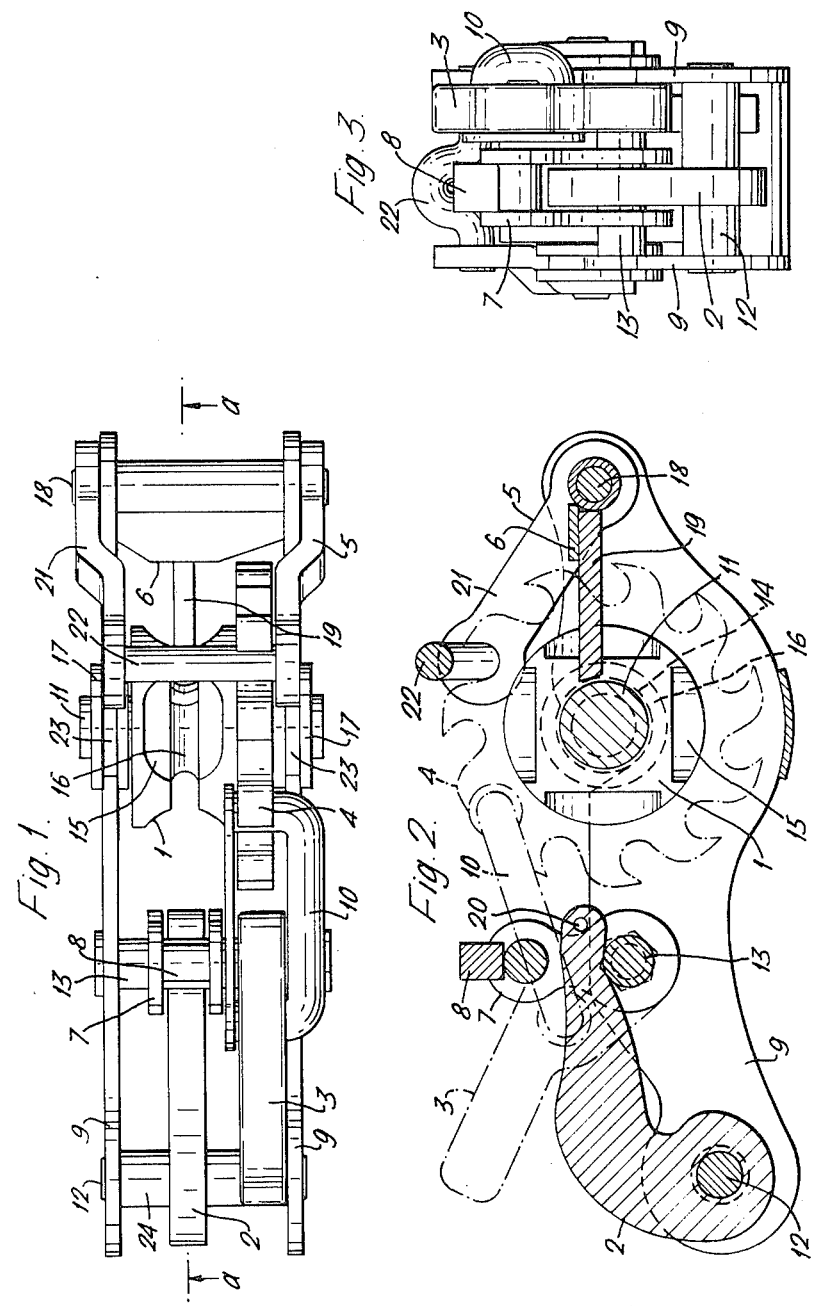

CHAIN TENSIONER

Devices are previously known in which a wire or rope is tensioned by turning a wire reel by means of back and forth movement of an operating lever with the aid of a ratchet wheel.

The chain tensioner in accordance with the present invention is mainly characterized in that it consists of the following combination of known components: a frame, a ratchet wheel mounted to the frame on a transverse shaft, which ratchet wheel can be turned by means of an operating lever and a push pawl fastened to the lever, a chain wheel preferably mounted on the same shaft with the ratchet wheel and turnable together with the ratchet wheel, a pawl by means of which backwards movement of the ratchet wheel can be prevented, as well as an instant-release lock fastened to the frame, onto which a fastening link can be inserted and which includes a locking link and locking pin mounted to the frame preferably on transversal shafts, whereby the outer end of the locking pin can be arranged inside the locking link. The instant-release lock makes fastening and detaching of the device very easy.

In the device, no wire with smooth surface is used, but a chain consisting of links. The surface of the chain wheel can then be provided with notches, into which the links of the chaim to be tensioned that assume a lying position on the wheel can fit, as well as with an annular groove into which the chain links that assume a standing position on the wheel can fit. In this way, the portion of the chain that is on the chain wheel remains steadily in position. Moreover, a chain remover is fastened to the frame of the device, which remover prevents the chain from being wound onto the wheel several turns.

The apparatus in accordance with the invention requires almost no servicing, and it is blocked neither by ice nor by rust. The other end of the chain to be tensioned may be fastened to a belt, rope, or wire, whereby the distance to be tensioned is equal to the length of the chain that is used.

The chain tensioner in accordance with the invention will be described more closely below with reference to the attached drawing, wherein FIG. 1 shows the device in accordance with the invention as viewed from the top, FIG. 2 shows a section along line a—a in FIG. 1, and FIG. 3 shows the device as viewed from the left end of FIGS. 1 and 2.

The frame F consists of two parallel plates 9 between which the transverse shafts of the device are arranged. The chain wheel 1 and the ratchet wheel 4 are fixed side by side rigidly onto the shaft 11, whose ends are provided with bearings 17. The bearings 17 are fitted into U-shaped notches in the frame plates 9, which notches are opened diagonally upwards and as inclined away from the direction of inlet of the chain to be tensioned. In the middle of the bearings, there is a groove 23 whose width corresponds to the thickness of the frame plates 9. The groove 23 fits against U-shaped journalling points 14 of the frames 9 to keep the shaft 11 in position in the longitudinal direction of the shaft 11. Moreover, the bearings 17 are fastened to the frame F by means of a few spot weldings, which can be easily detached if necessary.

The operating lever 3 is pivotably mounted on a shaft 13 mounted to the frame F. A U-shaped push pawl 10 is pivotably fastened to a bottom end of the operating lever 3, the outer end of which pawl fits to the toothing of a ratchet wheel 4. The pawl 10 is pressed against the ratchet wheel by the effect of its weight. The ratchet wheel 4 and the chain wheel 1 can be rotated clockwise as viewed in FIG. 2 by means of the operating lever 3 and the pawl 10. A locking pawl 5, consisting of two arms 21 of a transverse component 22 fastened between the outer ends of such arms, is pivotally fastened onto a shaft 18 fastened to the frame F. The transverse component 22 of locking pawl 5 fits into the toothing of the ratchet wheel 4 to prevent the ratchet wheel from rotating backwards, or counter-clockwise as viewed in FIG. 2. The transverse component 22 of the locking pawl 5 is pressed against the ratchet wheel 4 by the effect of its weight. The surface of the chain wheel 1 is provided with a suitable number, e.g. four, notches 15 into which the links of the chain which assume a lying position on the wheel 1 may fit. The middle portion of the wheel 1 has an annular groove 16 into which chain links assuming a standing position on the wheel 1 may fit. A pin 19, whose outer end extends into the groove 16 of the chain wheel, is welded to a transverse plate 6 fastened between the frame plats 9.

A locking pin 2 is pivotably fastened onto the shaft 12 placed at one end of the device. The pin 2 is mounted onto the shaft 12 by means of two bushings 24 welded thereto. A locking link 7 is pivotally mounted onto the shaft 13 along with the operating lever 3. The shaft 13 is placed between the shafts 12 and 11 on the frame plates 9. The outer end of the locking pin 2 can be placed into the locking link 7 so that the end of the pin 2 passed through the link 7. The tip of the pin 2 has a bore 20 for a safety key. The outer end of the locking link 7 has a contact peg 8 for hitting.

The chain tensioner in accordance with the invention functions as follows: The chain to be tensioned is inserted from below onto the chain wheel 1. A link of the fastening chain is inserted from desired position onto the locking pin 2 of the instant-release lock; the place of the device can be varied thereby. When the chain is tensioned, an extension arm is mounted onto the operating lever 3. The lever 3 is turned towards the ratchet wheel 4 until the locking pawl 5 has fallen into the next notch. The lever 3 is restored to the initial position and the back and forth movement is continued until the desired tension has been reached. The chain remover pin 19 prevents the chain from being wound onto the chain reel 1 several turns. The instant-release lock is closed by pushing the end of the locking pin 2 through the locking link 7. Locking is secured by inserting a safety key into the hole 20. The tensioner is opened by first removing the safety key from the hole 20 of the instant-release lock and by thereupon hitting on the hitting peg 8 of the locking link 7 of the instant-release lock. If desired, it is possible to slacken the tensioned chain by turning the ratchet wheel 4 in the opposite direction by means of the lever 3 one tooth at a time.

What we claim is:

1. In a device for tensioning a chain comprising a frame (9), a ratchet wheel (4) mounted to said frame on a ratchet wheel shaft (11), said ratchet wheel adapted for turning by means of an operating lever (3) and a push pawl (10) fastened to said lever, a chain wheel (1) mounted on said ratchet wheel shaft (11) with said ratchet wheel (4) and turnable together with said ratchet wheel, and a locking pawl (5) having a component (22) for engaging said ratchet wheel teeth, by means of which backwards movement of said ratchet wheel can be prevented, the improvement comprising:

a traverse fastening shaft (13) of said operating lever (3) passing through said operating lever and said frame at a longitudinal distance from said ratchet wheel shaft (11);

an instant-release lock (2) fastened to said frame (9) at a fastening end, said lock adapted to receive a fastening link;

said lock including a locking loop (7) mounted to said frame on a locking loop shaft (13) and a locking pin (2) mounted to said frame on a locking pin shaft (12), whereby an outer end of said locking pin can be arranged inside said locking loop; and said locking pawl (5) being mounted on a locking pawl shaft (18) at an opposite end of the frame (9) from said fastening end, said locking pawl shaft (18) being located in the direction of rotation of said ratchet wheel with respect to said component (22) of said locking pawl (5).

2. A device as claimed in claim 1, wherein said locking loop (7) and said operating lever (3) are located on said locking loop shaft (13) and said locking loop shaft (13) is located between said ratchet wheel shaft (11) and said locking loop shaft (12) of said locking pin (2).

3. A device as claimed in claim 1 or 2, further including journalling points (14) formed in the frame 9 at ends of said ratchet wheel shaft (11), said journalling points (14) being U-shaped extending diagonally upwards and inclined away from the direction of inlet of the chain to the tensioned.

4. A device as claimed in claim 1 or 2, wherein a surface of the chain wheel (1) is provided with notches (15) into which the links of the chain which assume a lying position on the wheel may fit as well as with an annular groove (16) into which the chain links which assume a standing position on the wheel may fit, and further including a chain remover (19) fastened to said frame (9) and an outer end of said chain remover being located in proximity to the chain wheel and extending into said groove (16) in said chain wheel.

* * * * *